(12) United States Patent  
Fujimori

(10) Patent No.: US 6,488,380 B1
(45) Date of Patent: Dec. 3, 2002

(54) PROJECTOR HAVING A LIGHT SHIELDING MEMBER

(75) Inventor: Motoyuki Fujimori, Suwa (JP)

(73) Assignee: Seiko Epson Corporation, Tokyo (JP)

(*) Notice: Subject to any disclaimer, the term of this patent is extended or adjusted under 35 U.S.C. 154(b) by 14 days.

(21) Appl. No.: 09/714,528

(22) Filed: Nov. 17, 2000

(30) Foreign Application Priority Data

Nov. 24, 1999 (JP) .......................................... 11-333495

(51) Int. Cl.[7] ........................ G03B 21/14; G03B 21/22; G03B 21/28; G03B 21/00; G03B 21/26
(52) U.S. Cl. ........................ 353/119; 353/33; 353/34; 353/60; 353/61; 353/81; 353/97
(58) Field of Search ........................ 353/119, 33, 34, 353/57, 31, 58, 60, 61, 81, 97

(56) References Cited

U.S. PATENT DOCUMENTS

| | | | | |
|---|---|---|---|---|
| 4,529,276 A | * | 7/1985 | Yamada | 359/211 |
| 5,855,488 A | * | 1/1999 | Heintz et al. | 439/310 |
| 6,067,128 A | * | 5/2000 | Imai | 349/8 |
| 6,199,987 B1 | * | 3/2001 | Haba et al. | 353/34 |
| 6,290,360 B1 | * | 9/2001 | Konuma et al. | 353/61 |

* cited by examiner

Primary Examiner—Christopher Mahoney
Assistant Examiner—Magda Cruz
(74) Attorney, Agent, or Firm—Oliff & Berridge PLC

(57) ABSTRACT

To provide a projector in which the quality of projected images does not deteriorate when the size of the projector is reduced. A light shielding member for shielding leakage light from gaps between each liquid crystal panel, and a crossed dichroic prism toward a projection lens side is provided. The leakage light from the gaps between each liquid crystal panel and the crossed dichroic prism can be shielded, and only the luminous flux emitted by the crossed dichroic prism can be applied to the projection lens, whereby the quality of projected images does not deteriorate when the device is reduced in size.

8 Claims, 15 Drawing Sheets

[FIG. 1]
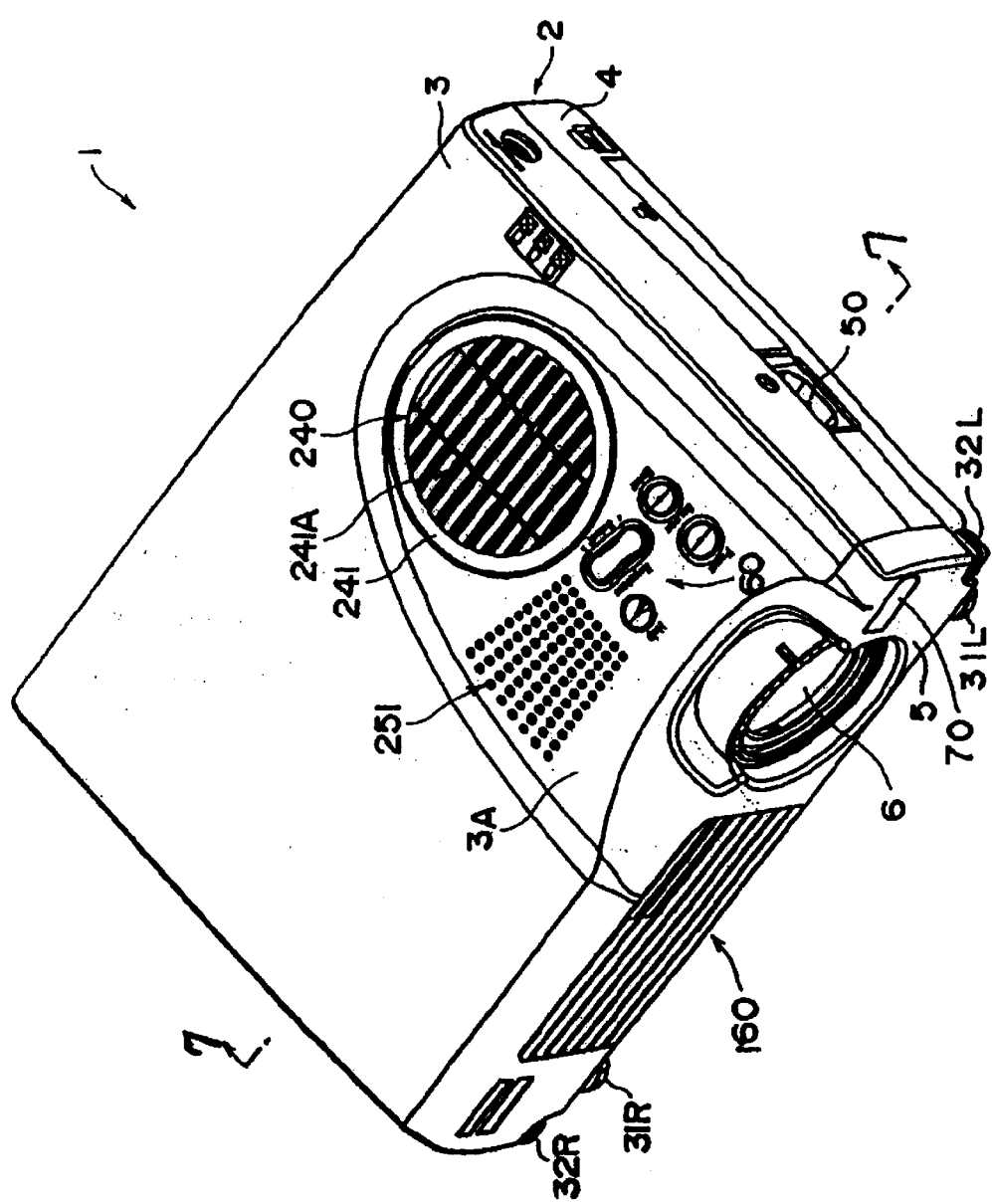

[FIG. 2]
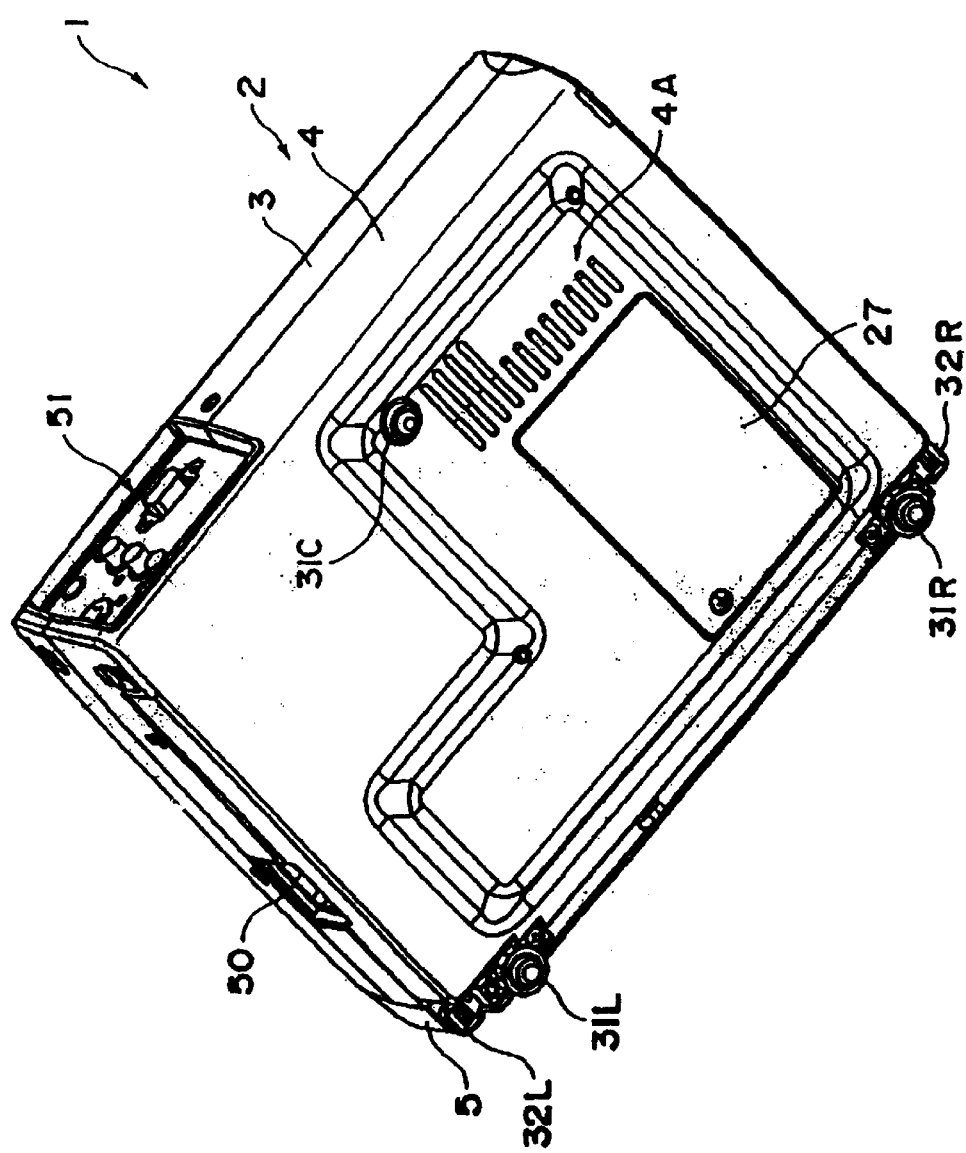

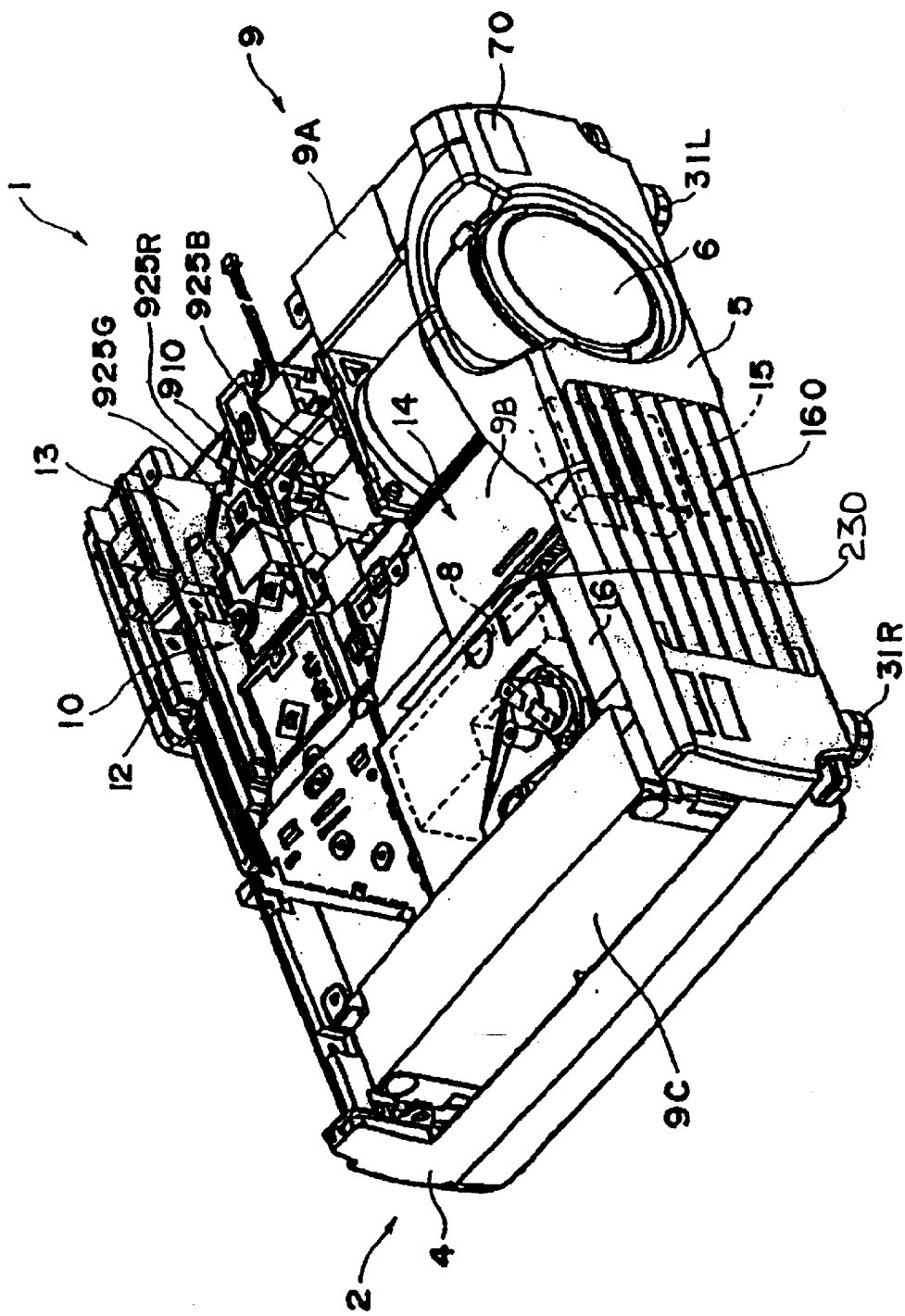
[FIG. 3]

[FIG. 4]
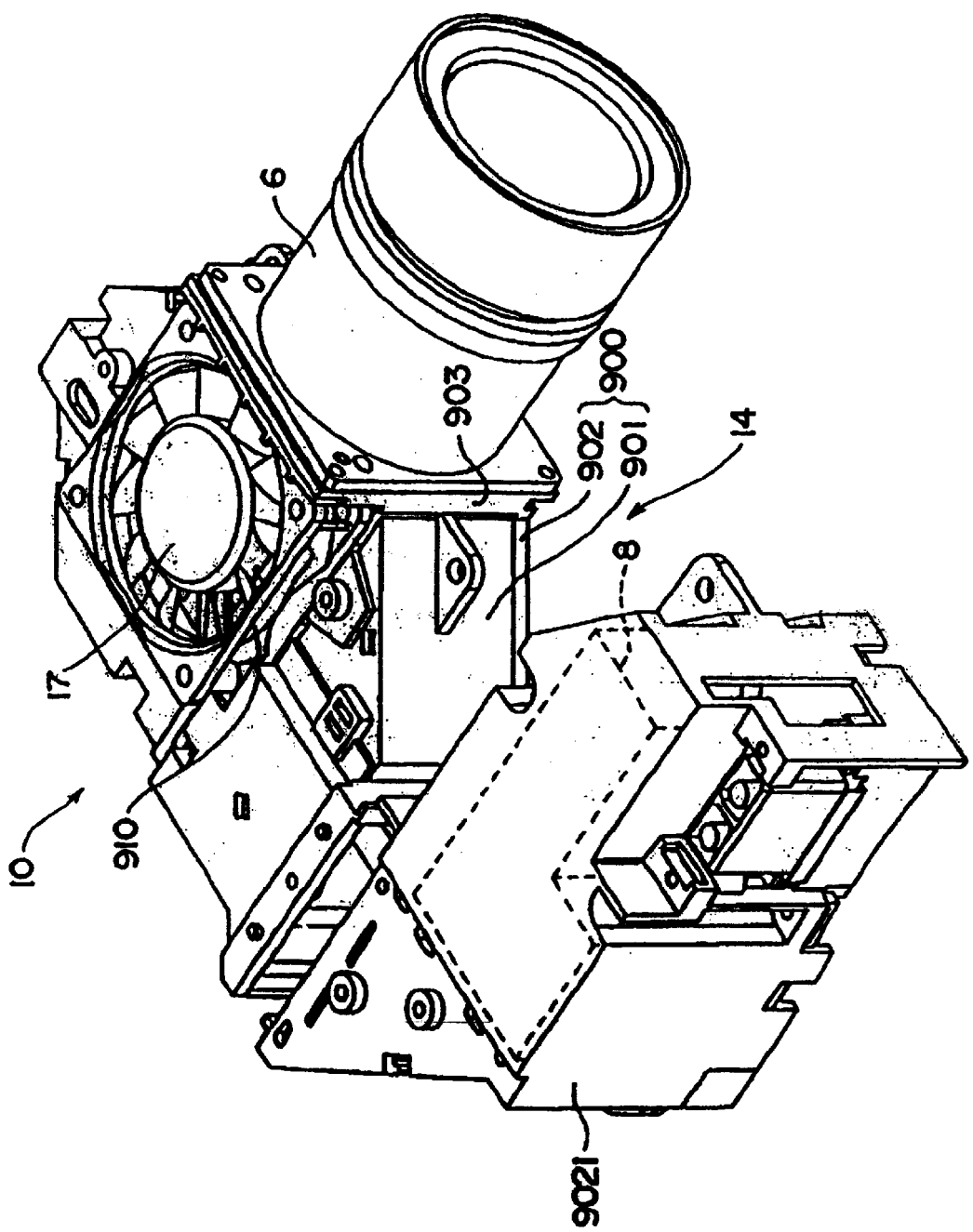

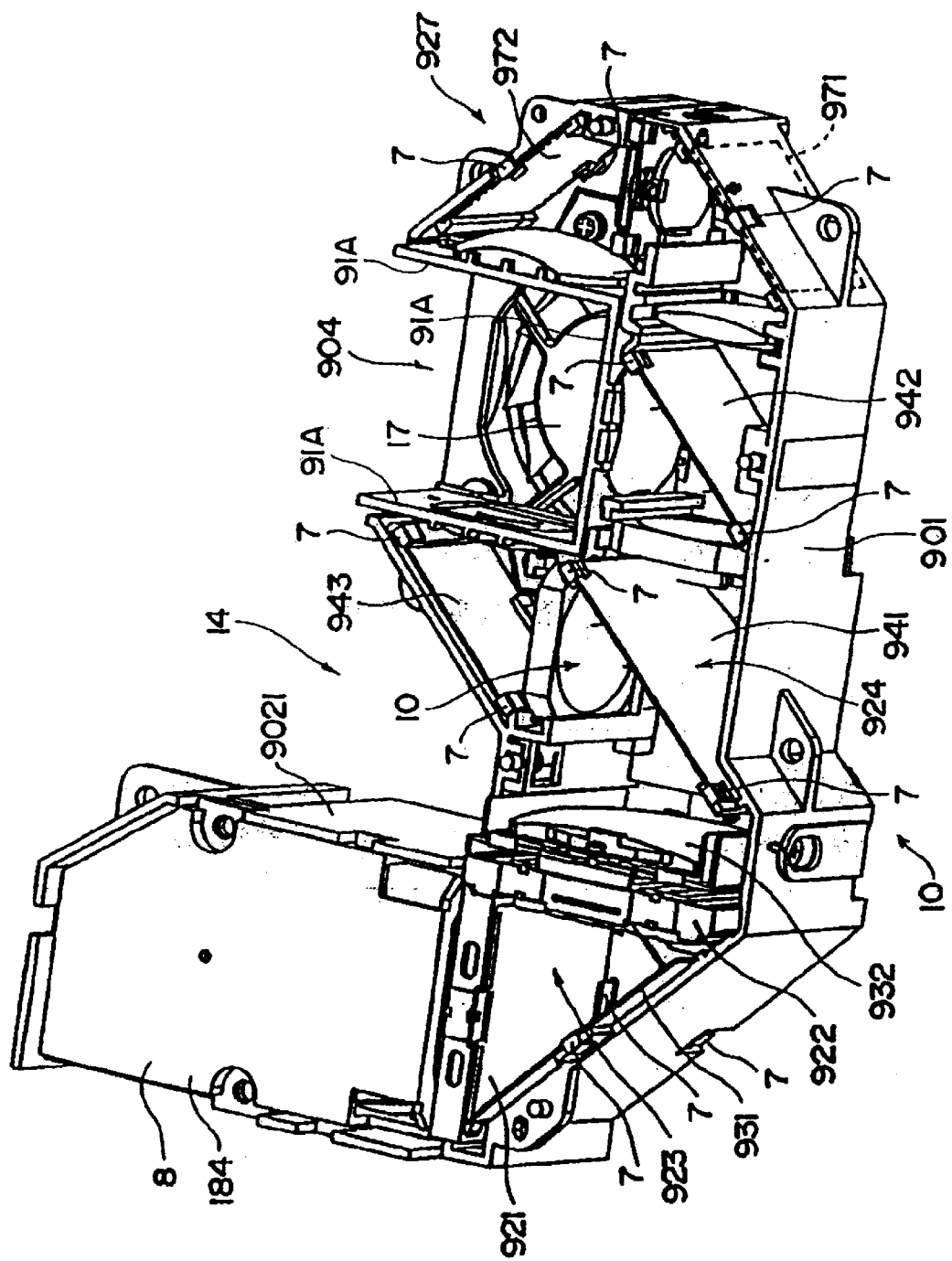
[FIG. 5]

[FIG. 6]
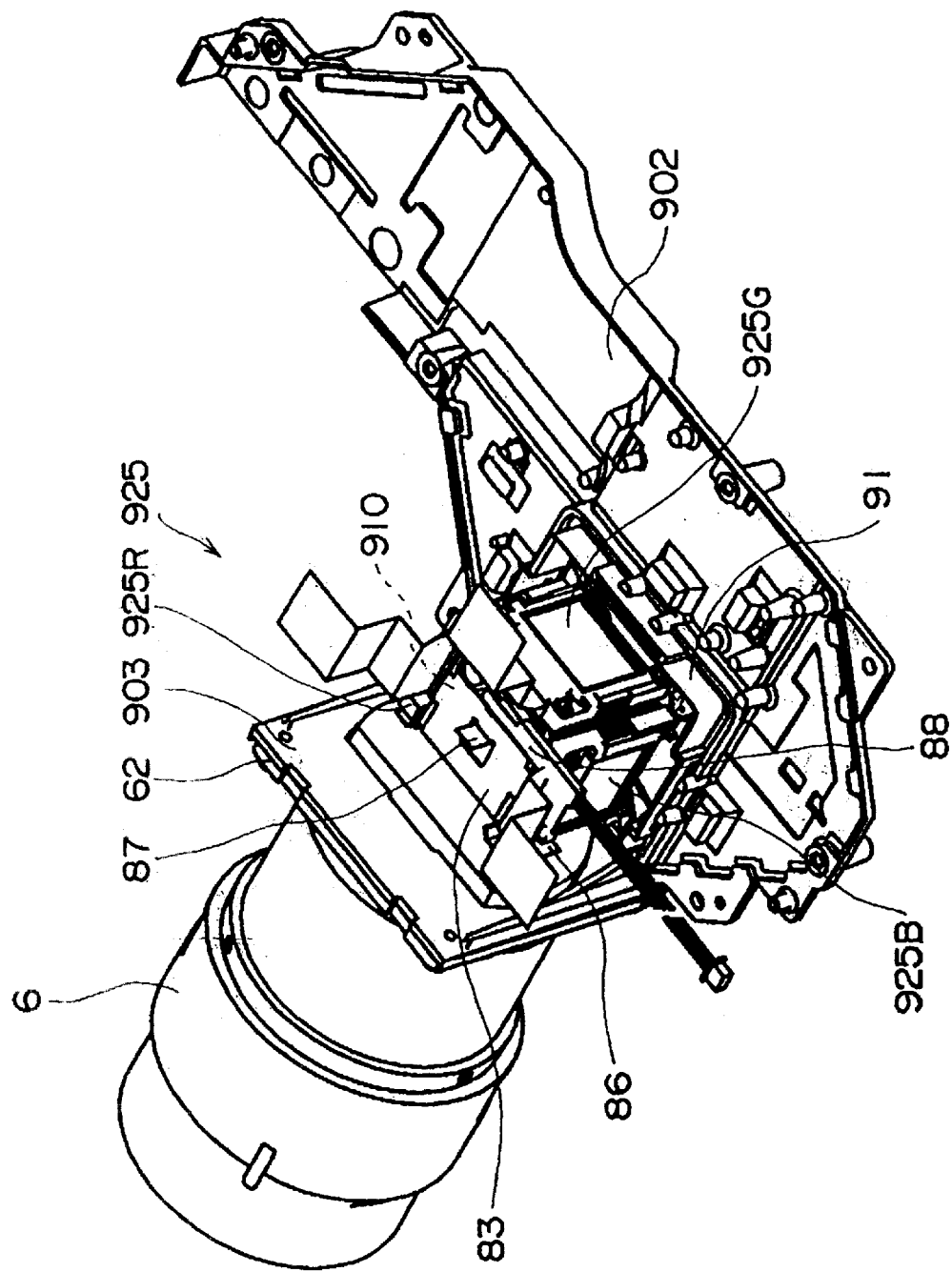

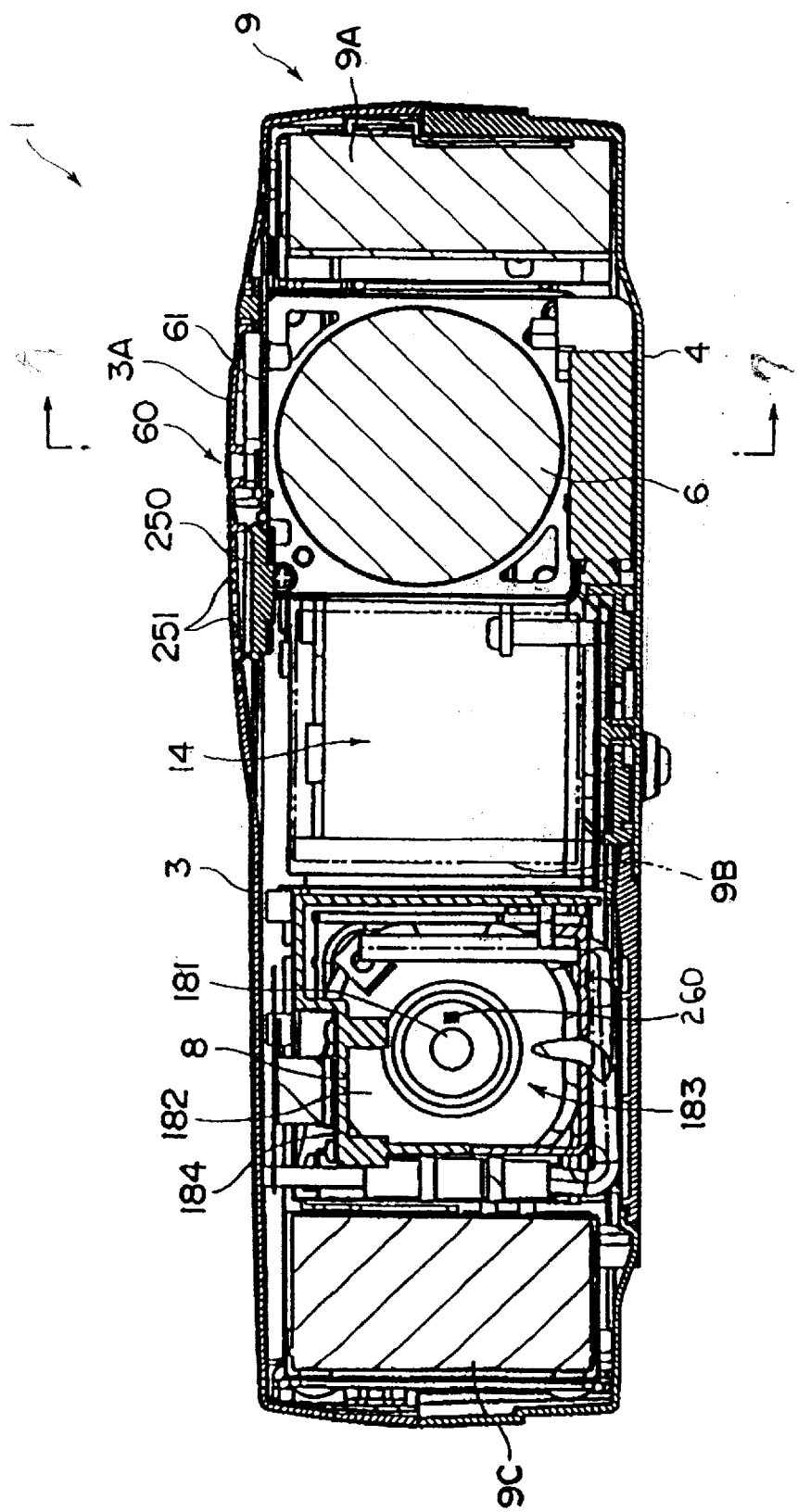
[FIG. 7]

[FIG. 8]
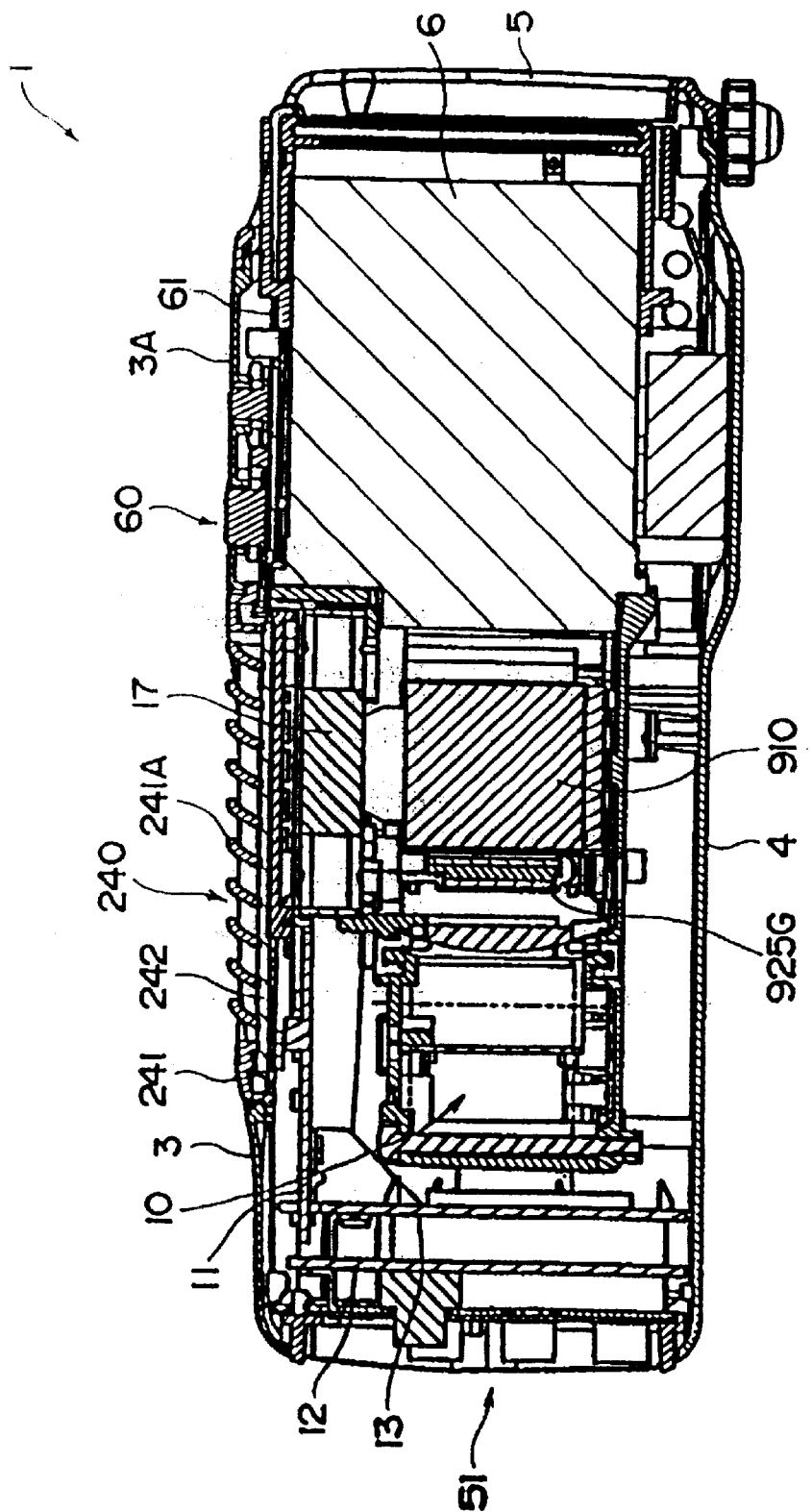

[FIG.9]
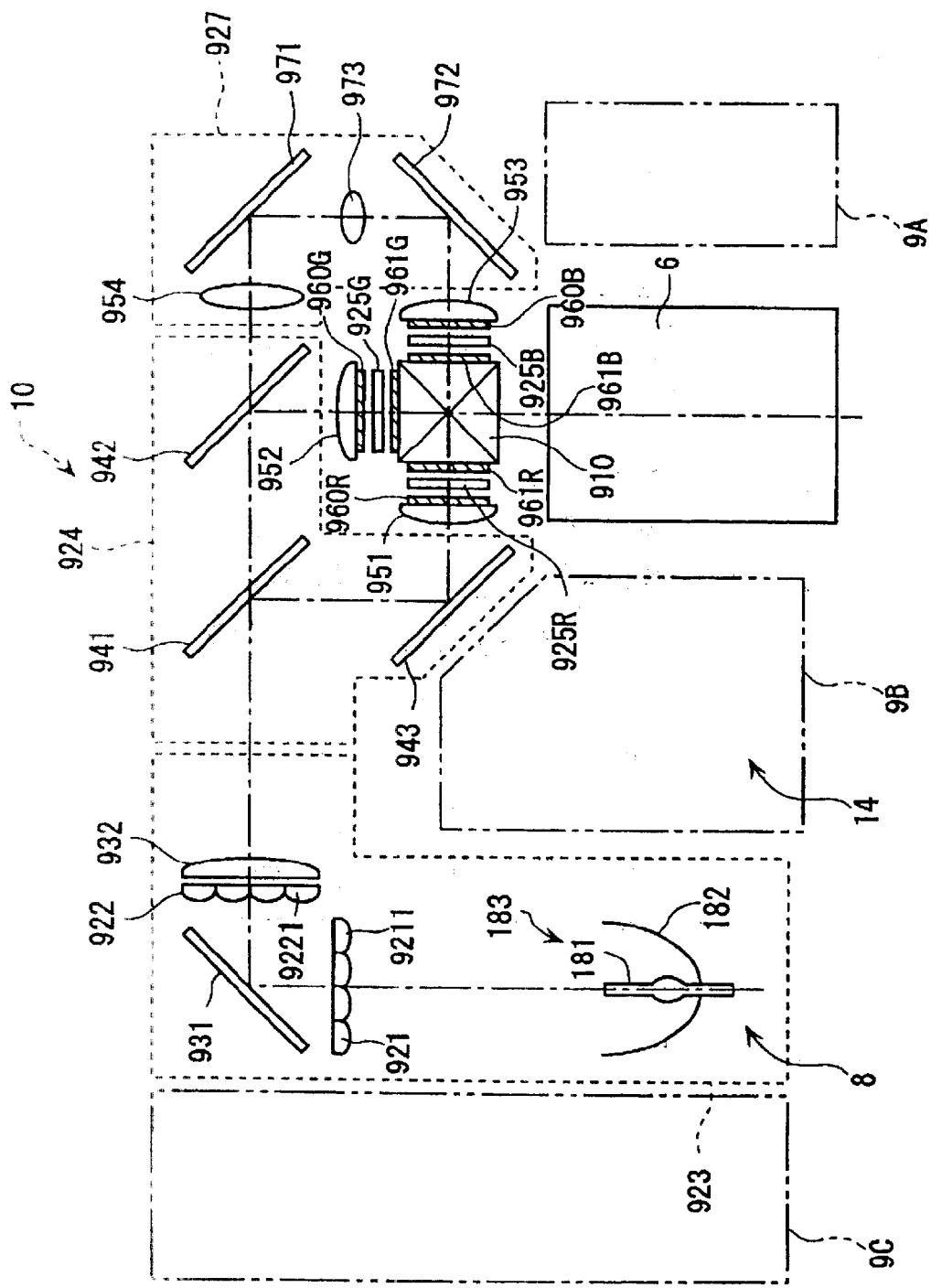

[FIG. 10]
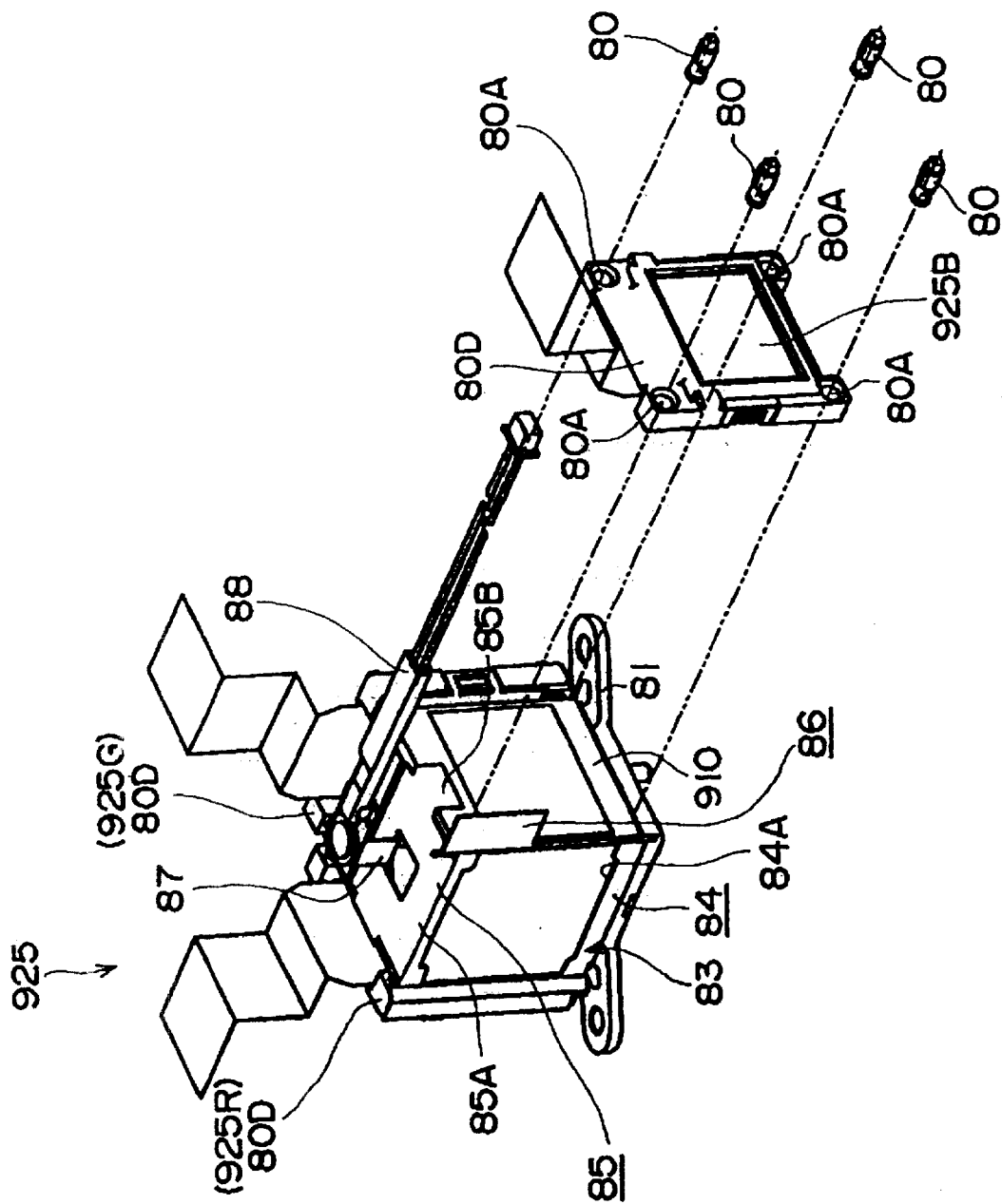

[FIG. 11]
(A)
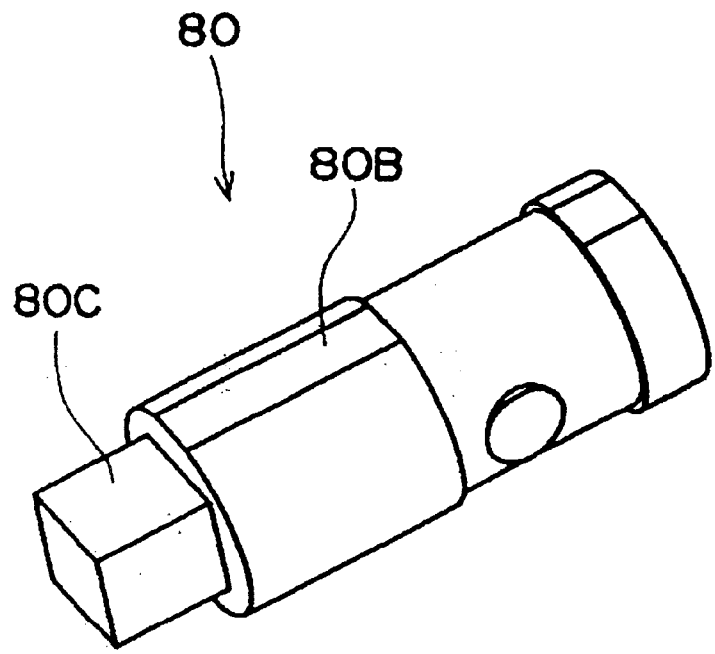
(B)
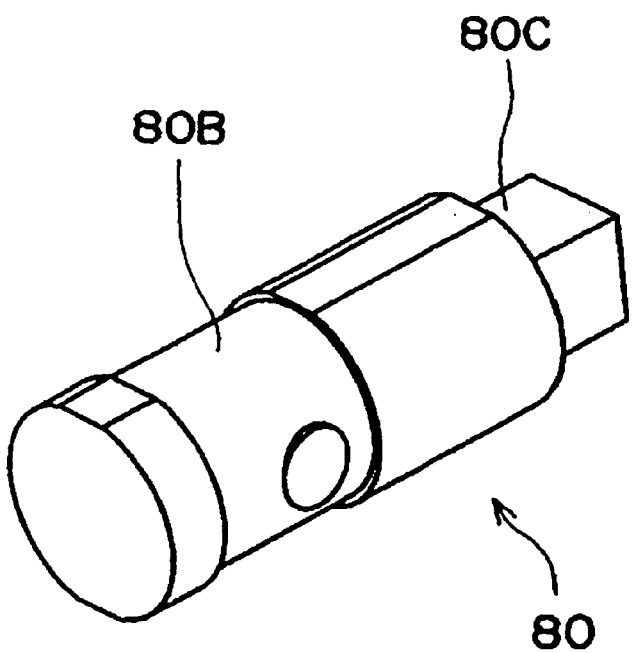

[FIG. 12]
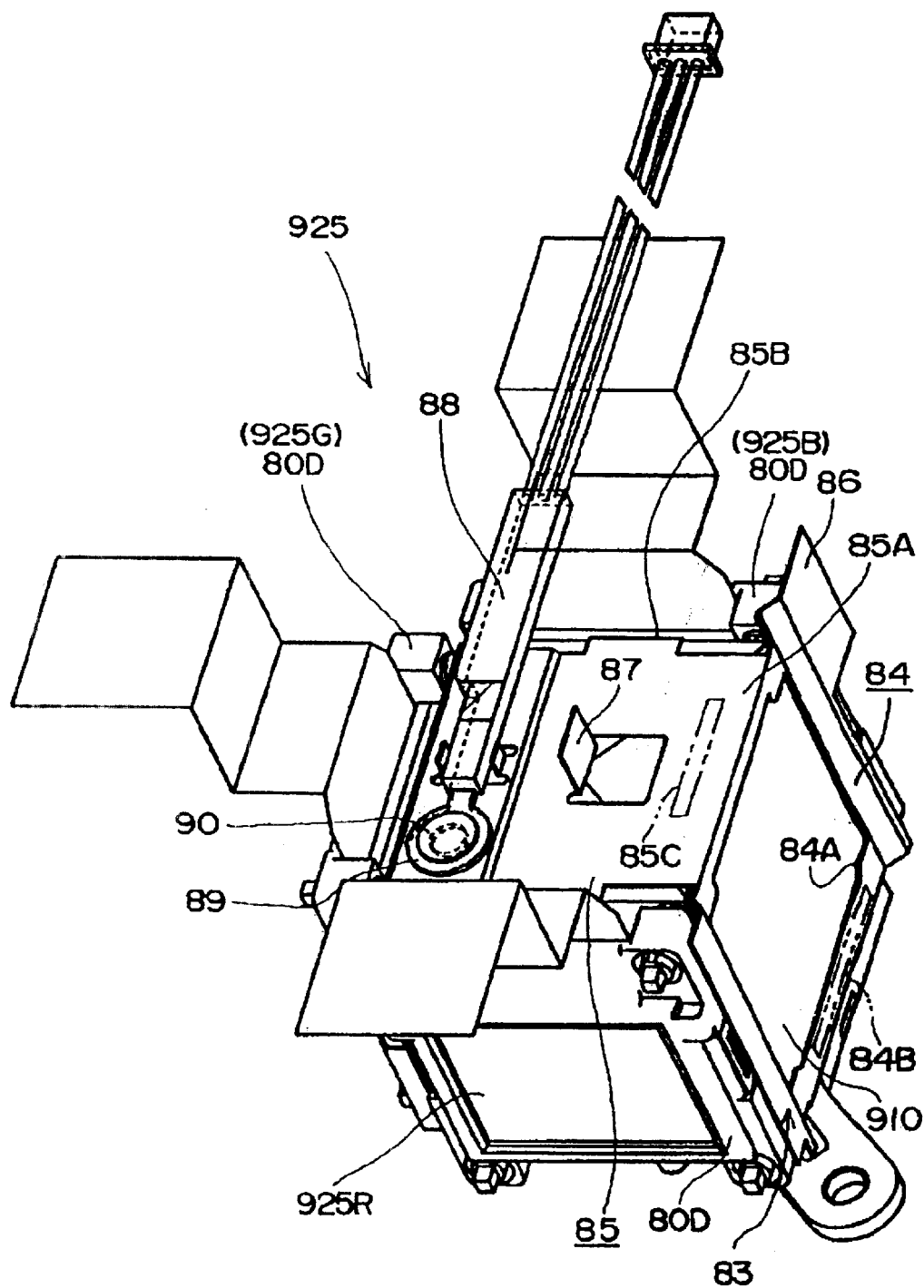

[FIG. 13]
(A) 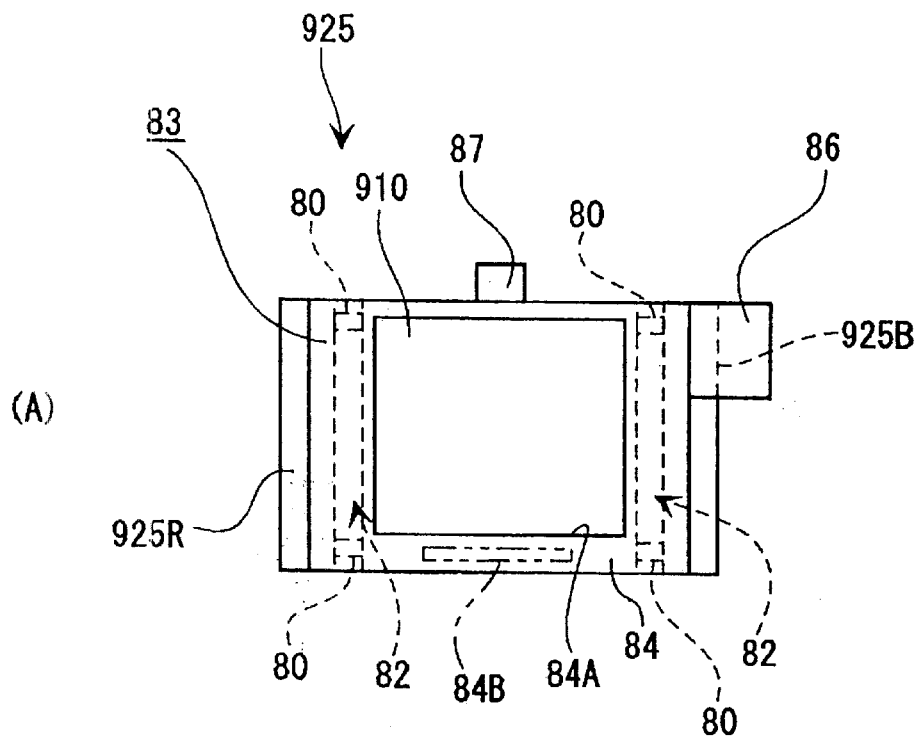
(B) 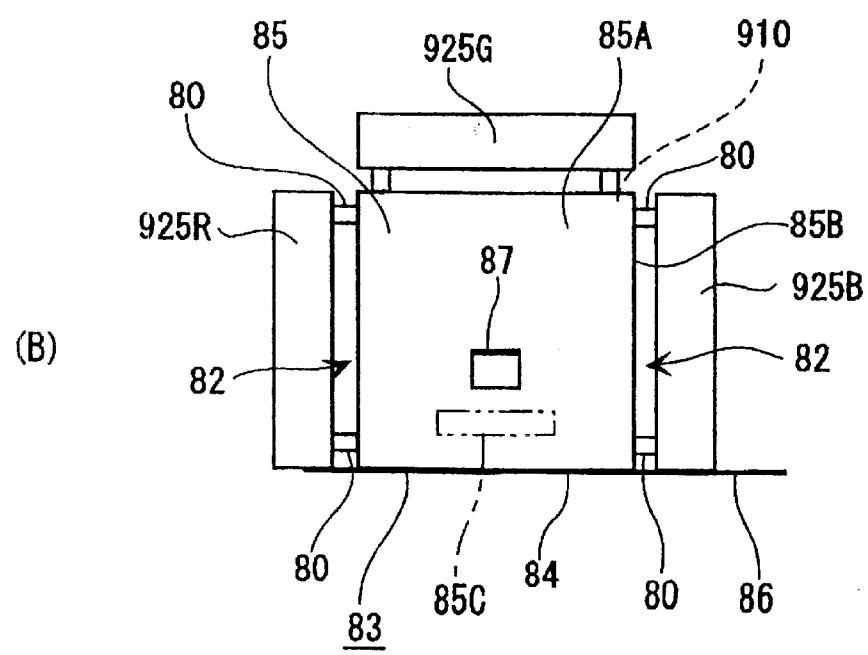

[FIG. 14]
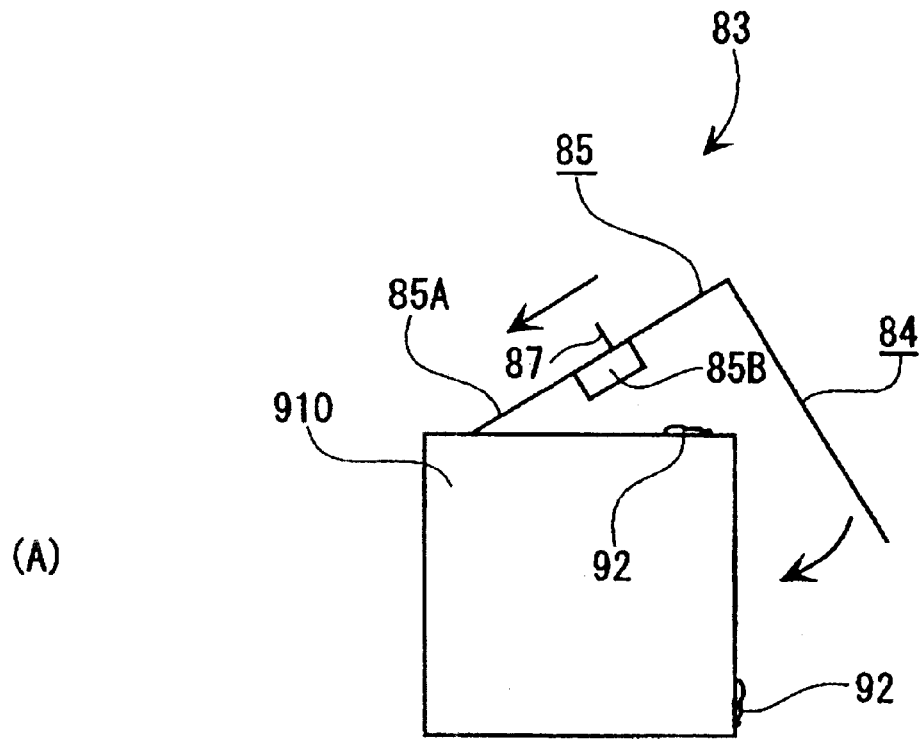
(A)
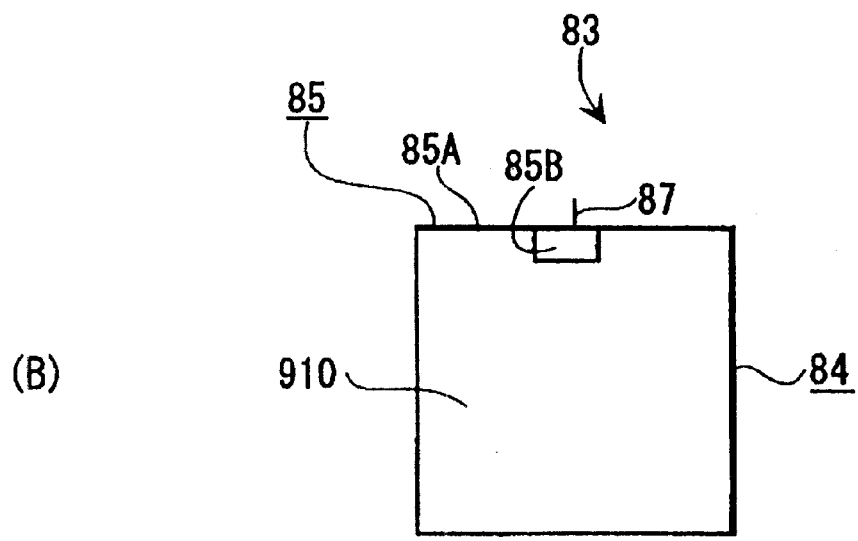
(B)

[FIG. 15]
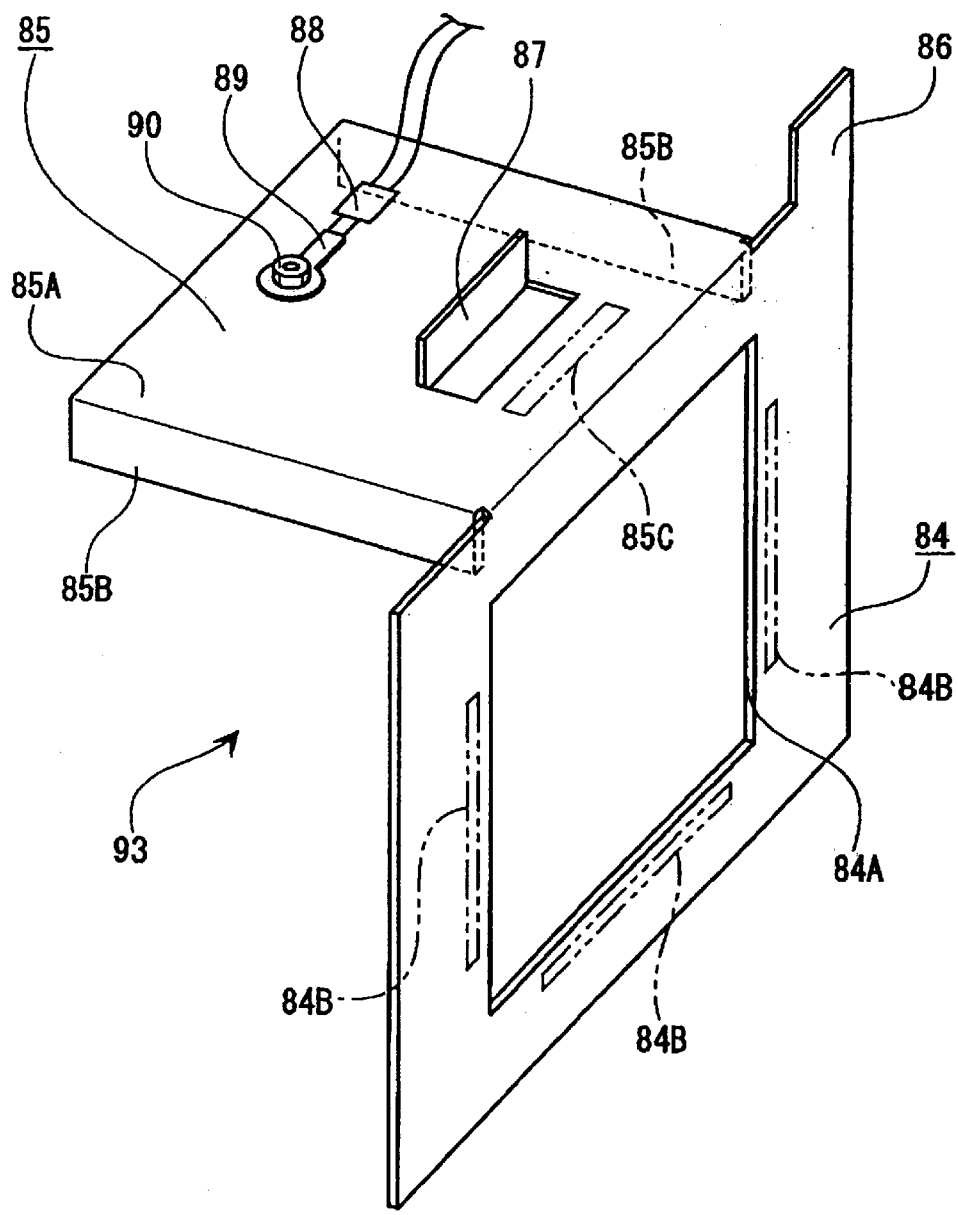

PROJECTOR HAVING A LIGHT SHIELDING MEMBER

BACKGROUND OF THE INVENTION

1. Field of Invention

The present invention relates to a projector including optical modulation devices for modulating a plurality of colored light beams in accordance with image data, a prism for combining the modulated luminous fluxes modulated by the optical modulation devices, and a projection lens for enlarging and projecting the light beams combined by the prism.

2. Description of Related Art

Hitherto, projectors have been used which include three optical modulation devices for modulating a plurality of colored light beams in accordance with image data, a crossed dichroic prism for combining the light beams modulated by the three optical modulation devices, and a projection lens for enlarging and projecting the light beams combined by the prism.

The projectors are widely used for multimedia presentations at public meetings, such as conferences, academic meetings, and exhibitions. The projector is brought to the conference room, as needed, and is moved to another place after the use. Therefore, a progessive reduction in size of the projectors has occurred.

Recently, projectors have been reduced in size and have been provided with a structure in which three optical modulation devices are fixed to the side faces of a crossed dichroic prism via a fixing member, so as to simplify the structure. Hereinafter, the structure is called a "POP" structure (panel on prism structure).

In the POP structure, optical modulation devices supported by supporting frames are fixed by soldering or via an adhesive to the faces of a prism at a predetermined distance from the faces of the prism.

In the POP structure, gaps are likely to be produced in the fixed parts because the optical modulation devices and the prism are fixed to each other at a predetermined distance from each other. In this case, other than the light beams emitted by the prism, the projection lens receives light beams leaking toward the projection lens from the gaps between the prism and the optical modulation devices. There is a problem in that the quality of images projected on a screen deteriorates when leakage from the light beams is applied to the projection lens.

Accordingly, an object of the present invention is to provide a projector in which the quality of projected images does not deteriorate when the size of the projector is reduced.

SUMMARY OF THE INVENTION

According to the present invention, a projector comprises a plurality of optical modulation devices for modulating a plurality of colored light beams in accordance with image data; a prism for combining the light beams modulated by the optical modulation devices; and a projection lens for enlarging and projecting the light beams combined by the prism. The plurality of optical modulation devices are mounted on the prism at side faces thereof at a predetermined distance from the side faces of the prism. A light shielding member is provided for shielding light which leaks from gaps between the optical modulation devices and the side faces of the prism toward the projection lens side.

According to the present invention, the light shielding member shields leakage light from the gaps between the optical modulation device and the prism toward the projection lens side, whereby only the luminous fluxes emitted by the prism are applied to the projection lens. Therefore, the quality of projected images does not deteriorate when reducing the size.

The projector preferably further comprises an outer casing for receiving the optical modulation devices, the prism, and the projection lens; an air inlet formed in the external face of the outer casing, for introducing air from the outside to the inside of the outer casing as cooling air; and a cooling fan for introducing the cooling air through the air inlet and cooling the optical modulation devices. The light shielding member may be provided with a flow-regulating part for introducing the cooling air from the cooling fan toward the optical modulation devices.

With this arrangement, cooling air from the cooling fan can be applied easily in large volume to the optical modulation devices which are not heat resistant, by guiding the cooling air by the flow-regulating part, thereby cooling the optical modulation devices effectively.

The plurality of optical modulation devices are preferably three optical-modulation devices for modulating red, green, and blue colored luminous fluxes, respectively. The flow-regulating part is preferably disposed in the vicinity of the optical modulation device for modulating the blue colored luminous flux.

The blue luminous flux contains large energy. Therefore, a modulation device for modulating the blue luminous flux is likely to heat up excessively. By disposing the flow-regulating part in the vicinity of the optical modulation device for modulating the blue luminous flux, the cooling air from the cooling fan guided by the flow-regulating part can be applied in large volume to the optical modulation device for modulating the blue luminous flux, thereby suppressing rapid rise in the temperature of the optical modulation device, whereby the cooling efficiency of the optical modulation devices can be further improved.

The light shielding member is preferably provided with an opening for leading therethrough light beams emitted from the prism and a positioning part for determining the relative position between the opening and a light emission surface of the prism. When an opening is formed in the light shielding member through which the light beams are to be emitted by the prism, and the opening is not disposed at a predetermined position, there is a risk of deteriorating the quality of projected images by cutting away a part of the luminous flux emitted by the prism. In contrasts, such a problem can be avoided when the light shielding member is provided with a positioning part. The positioning part is configured with a first positioning section which comes into contact with the upper or lower face of the prism and a second positioning section which comes into contact with side faces of the prism, whereby the horizontal and vertical position of the opening of the light shielding member can be determined easily, thereby facilitating the operation of mounting the light shielding member.

The light shielding member is preferably made of a metal, and is preferably provided with a temperature-determining unit for determining the temperature of the optical modulation devices. Since the light shielding member made of a metal is thermally conductive, the temperature-determining unit can determine the temperature close to the actual temperature of the optical modulation devices. Therefore, the temperature of the optical modulation devices can be determined with high accuracy compared with a case in which the temperature of cooling air in the vicinity of the optical modulation devices is determined, whereby the temperature rise in the optical modulation devices can be suppressed easily and positively.

The temperature-determining unit is preferably formed so as to output determined signals to a control board for controlling the cooling fan. By the temperature-determining unit thus formed, when the temperature of the light shielding member is high, that is, when the temperature of the optical modulation devices is determined to be higher than a given temperature, the revolution of the cooling fan can be controlled to increase so as to rapidly cool the optical modulation devices. When the temperature of the light shielding member is low, that is, when the temperature of the optical modulation devices is determined to be lower than a given temperature, the revolution of the cooling fan can be controlled to decrease so as to gradually cool the optical modulation devices.

The light shielding member is preferably provided with a cut-and-raised tab formed by cutting and raising a part of the light shielding member.

With this arrangement, the light shielding member can be easily mounted on and removed from the prism by moving the light shielding member by holding the cut-and-raised tab. The operator can more easily mount and remove the light shielding member on and from the prism without touching the incident surfaces and the light emission surface of the prism.

The opening is preferably formed in a shielding part disposed in contact with the light emission surface of the prism, the shielding part is preferably fixed to the light emission surface of the prism, and the positioning part is preferably fixed to a surface of the prism other than the light emission surface thereof. The shielding part is preferably bonded to the light emission surface of the prism along edges of the opening. Double-sided tapes, liquid adhesive, or the like may be used as an adhesive.

With this arrangement, the operation of mounting the shielding member on the prism can be simplified. By using double-sided tapes, the bonding operation can be made simple, and since it is not necessary to be concerned about leakage or the like of an adhesive, the operation of mounting the light shielding member on the prism can be made more simple.

An antireflection film for suppressing reflection of light beams is preferably provided at at least one section of the light shielding member. When the light shielding member is provided with an antireflection film, a risk can be avoided, in which light beams shielded by the light shielding member are reflected thereby and are applied to optical elements, such as the projection lens, thereby affecting the images.

The projector preferably further comprises an optical-component casing for receiving optical components. The prism may be mounted in the optical-component casing via a prism-supporting member for supporting the prism, and the light shielding member may be disposed between the prism and the optical-component casing so as to cover the lower part of the side faces of the prism on which the optical modulation device is mounted.

With this arrangement, leakage light from the lower part of the prism can be shielded, whereby only the luminous fluxes emitted by the prism are applied to the projection lens. Therefore, the quality of projected images does not deteriorate when the size is reduced.

BRIEF DESCRIPTION OF THE DRAWINGS

FIG. 1 is an exterior perspective view from an upper side of a projector according to an exemplary embodiment of the invention.

FIG. 2 is an exterior perspective view from a lower side of the projector according to an exemplary embodiment of the invention.

FIG. 3 is a perspective view of an inner structure of the projector according to an exemplary embodiment of the invention.

FIG. 4 is a perspective view of an optical system of the projector according to an exemplary embodiment of the invention.

FIG. 5 is a perspective view of a structure of an optical system according to an exemplary embodiment of the invention.

FIG. 6 is a perspective view of the structure of the optical system according to an exemplary embodiment of the invention.

FIG. 7 is a vertical sectional view of the projector shown in FIG. 1 along line VII—VII.

FIG. 8 is a vertical sectional view of the projector shown in FIG. 7 along line VIII—VIII.

FIG. 9 is a schematic diagram showing the function of the optical system according to an exemplary embodiment of the invention.

FIG. 10 is an exploded perspective view of an exemplary mounting structure for mounting a liquid crystal panel on a crossed dichroic prism.

FIG. 11 includes perspective views of an exemplary pin according to a exemplary embodiment of the invention.

FIG. 12 is a perspective view of an exemplary embodiment of the embodiment.

FIG. 13 includes a front view (A) and a plan view (B) of an exemplary light shielding member mounting structure according to an exemplary embodiment of the invention.

FIG. 14 includes illustrations showing steps of mounting the exemplary light shielding member according to an exemplary embodiment of the invention.

FIG. 15 is a perspective view of a modified exemplary light shielding member according to an exemplary embodiment of the invention.

DETAILED DESCRIPTION OF EXEMPLARY EMBODIMENTS

Embodiments according to the present invention are described below with reference to the drawings.
(1) General Configuration of the Device FIGS. 1 and 2 are schematic perspective views of a projector 1 according to the present embodiment. FIG. 1 is a perspective view of the projector 1 from the upper side, and FIG. 2 is a perspective view thereof from the bottom.

The projector 1 is of a type in which a luminous flux emitted by a light source device as a light source is split into three luminous fluxes of the primary colors which are red (R), green (G), and blue (B). Each colored luminous flux is transmitted through and modulated, in accordance with image data, by a liquid crystal panel forming a modulation system. The modulated luminous fluxes of each color are synthesized by a crossed dichroic prism, and the synthesized fluxes are displayed enlarged on a projection area through a projection lens 6. Each component unit is received in an outer casing 2. The projection lens 6 is disposed so as to protrude from the outer casing 2, as needed, by a zoom mechanism.
(2) Structure of the Outer Casing The outer casing 2 includes, as major components, an upper case 3 covering the upper portion of the device, a lower case 4 forming the bottom of the device, and a front case 5 covering the front. The upper case 3 and the lower case 4 are made by die-casting magnesium, and the front case 5 is made of resin.

The upper case 3 is provided with an air-inlet 240 in the upper face thereof toward the right from the center (in front view). The air-inlet 240 is covered by a filter-exchange cover 241 made of resin. The filter-exchange cover 241 is provided with slit-shaped holes 241A for introducing air from the outside into the device for cooling. An air filter 242 (see FIG. 8) is provided under the filter-exchange cover 241. By removing the filter-exchange cover 241 from the upper face of the upper case 3, the air filter 242 in the device can be exchanged.

A number of through-holes 251 for a speaker 250 (see FIG. 7) are formed in the upper face of the upper case 3 toward the front side from the filter-exchange cover 241. A control panel 60 for controlling the image quality and the like of the projector 1 is provided beside the through holes 251. A portion of the upper case 3 which is provided with the filter-exchange cover 241, the through-holes 251, and the control panel 60 is raised so as to form a raised part 3A, as shown in FIGS. 7 and 8. Components such as the air filter 242, the speaker 250, and a circuit board 61 are received in an inner space formed by the raised part 3A.

In FIG. 2, a lamp-replacement cover 27 is provided in the bottom face of the lower case 4. A lamp unit 8 (see FIGS. 3 and 4) is received under the lamp-replacement cover 27, and by removing the lamp-replacement cover 27, the lamp unit 8 is replaced. Feet 31R and 31L are provided on the bottom face of the lower case 4 at the corners of the front part, and a foot 31C is provided on the bottom face of the lower case 4 at an intermediate part of the rear side. The feet 31R and 31L extend and withdraw in the protruding direction by rotating a dial or by moving levers 32R and 32L. The height and inclination of a displayed picture plane can be changed by controlling the amount of protrusion of each of the feet 31R and 31L.

The front case 5 is provided with a light receiving part 70 at the right part of the face of the front case 5 for receiving optical signals from a remote controller (not shown). The front case 5 is provided with an air outlet 160 at the center of the front case 5 for discharging the air from the device substantially.

On the side face and the rear face on the air-inlet 240 side of the outer casing 2, terminals, such as an AC inlet 50 for connection to an external power supply, and various input and output terminals 51 are provided.

(3) Internal Structure of the Device

The internal structure of the projector 1 is shown in FIGS. 3 to 8. FIG. 3 is a schematic perspective view of the inside of the projector 1. FIG. 4 is a perspective view of an optical system. FIGS. 5 and 6 are perspective views of the inside of the optical system. FIGS. 7 and 8 show vertical sections of the projector 1.

As shown in these drawings, the light source lamp unit 8, a power supply unit 9, an optical unit 10, a driver board 11 (see FIG. 8), a main board 12, an AV board 13, and the like are disposed in the outer casing 2. According to the present embodiment, the light source lamp unit 8, the optical unit 10, and the above-described projection lens 6 form a U-shaped (in plan view) optical system according to the present invention, as shown in FIG. 9. The boards 11, 12, and 13 (see FIG. 8) constitute a control system according to the present invention.

The power supply unit 9 is configured with a first power supply block 9A disposed at the side of the projection lens 6 of the optical system, a second power supply block 9B disposed in a recess 14 formed in the U-shaped (in plan view) optical system at an intermediate part thereof, that is, between the projection lens 6 and the light source unit 8, and a third power supply block 9C disposed at the side of the light source lamp unit 8 of the optical system.

The first power supply block 9A is provided with the above-described AC inlet 50, and distributes the power supplied from an external power source through the AC inlet 50 (see FIG. 2) to the second and third power supply blocks 9B and 9C.

The second power supply block 9B transforms the voltage of the power supplied by the first power supply block 9A, and supplies the transformed power to the main board 12 (see FIG. 8) which is a major component of the control system. An auxiliary exhaust fan 15 (see FIG. 3) driven by the power supplied by the second power supply block 9B is disposed at the air outlet 160 (see FIG. 3) side of the second power supply block 9B.

The third power supply block 9C transforms the voltage of the power supplied by the first power supply block 9A, and supplies the transformed power to a light source device 183 (see FIG. 9) as a light source included in the light source lamp unit 8. Since the third power supply block 9C must supply power to the light source device 183 which consumes the greatest amount of electricity, the third power supply block 9C is larger than the first and second power supply blocks 9A and 9B, and is disposed along the entire projector 1 (see FIG. 3).

The first, second, and third power supply blocks 9A, 9B, and 9C are fixed to the lower case 4 (see FIG. 3) by screws or the like before affixing the projector lens 6 and the optical unit 10. The first power supply block 9A may supply power only to the second power supply block 9B, and the second power supply block 9B may distribute the power to the third power supply block 9C.

The light source lamp unit 8 functions as a light source for the projector 1. As shown in FIG. 9, the light source lamp unit 8 includes the light source device 183 including a light source lamp 181 and a concave mirror 182, and a lamp housing 184 (see FIG. 7) containing the light source device 183.

The lamp housing 184 is provided with an on-off detector 260 for determining whether or not the light source lamp 181 is in use.

The light source lamp unit 8 including the lamp housing 184 is covered by a receiving part 9021 (see FIG. 4) which is formed integrally with an upper light guide 901 (see FIG. 4) forming a light guide 900 (see FIG. 4) which is described below. The light source lamp unit 8 can be removed by removing the above-described lamp-exchange cover 27 (see FIG. 2). A main exhaust fan 16 (see FIG. 3) which is larger than the auxiliary exhaust fan 15 (see FIG. 3) is disposed at the front of the receiving part 9021 (see FIG. 4) at a position associated with the air outlet 160 (see FIG. 3). The main exhaust fan 16 (see FIG. 3) is driven by the power supplied from the second power supply block 9B.

As shown in FIG. 4, the optical unit 10 forms an optical image by optically processing the luminous fluxes from the light source lamp unit 8 in accordance with image data. The optical unit 10 is provided with the light guide 900 which is an optical-component casing. The light guide 900 is configured with the upper light guide 901 which is made of resin and is box-shaped and a lower light guide 902 which is made of magnesium and is lid-shaped. The optical unit 10 includes an optical illumination system 923, (see FIG. 5) a colored-light-beam separating optical system 924, (see FIG. 5) an electro-optical device 925 (see FIG. 6) which is a modulation system, and a crossed dichroic prism 910. The lower light guide 902 is provided with a vertical head plate 903 (see FIG. 6) to which the projection lens 6 is fixed. The optical elements of the optical unit 10, other than the electro-optical device 925 (see FIG. 6) and the crossed dichroic prism 910, are held between the upper and lower light guides 901 and 902 to be sandwiched thereby. The upper light guide 901 and the lower light guide 902 are assembled as a unit and are fixed to the lower case 4 (see FIG. 3) side.

The crossed dichroic prism 910 is disposed at the opposite side to the projection lens 6 across the head plate 903 (see FIG. 6) therebetween, and is fixed to the lower light guide 902 by a fixing material. Liquid crystal panels 925R, 925G, and 925B, (see FIG. 6) which form the electro-optical device 925, are disposed opposing three faces of the crossed dichroic prism 910 and are fixed to the opposing faces thereof by a fixing material. The liquid crystal panels 925R, 925G, and 925B (see FIG. 6) are positioned so that the liquid crystal panel 925B and the liquid crystal panel 925R oppose each other with the crossed dichroic prism 910 therebetween, and the liquid crystal panel 925G opposes the projection lens 6 with the crossed dichroic prism 910 therebetween. The liquid crystal panels 925R, 925G, and 925B are cooled by cooling air applied by an air intake fan 17 disposed above the crossed dichroic prism 910 and associated with the air-inlet 240. (see FIG. 1) The power for driving the air intake fan 17 is supplied by the main board 12 (see FIG. 8) through the driver board 11 (see FIG. 8).

The driver board 11 (see FIG. 8) for controlling the liquid crystal panels 925R, 925G, and 925B is disposed above the optical unit 10.

As shown in FIG. 8, the main board 12 which is provided with a control circuit for controlling the entire projector 1 is disposed in a vertical manner at the rear side of the optical unit 10. The main board 12 and the driver board 11 disposed perpendicular to each other are electrically connected to each other via a connector. The main board 12 is connected through a cable to a lamp-signal-detecting circuit board 230 for detecting signals from the on-off detector 260.

The AV board 13 is a circuit board provided with the input and output terminals 51, is disposed in a vertical manner between the optical unit 10 and the main board 12, and is electrically connected to the main board 12.

In the above-described internal structure, cooling air introduced by the air-intake fan 17 cools the electro-optical device 925, (see FIG. 6) and is led to the side of the light source lamp unit 8, (see FIG. 3) while cooling the boards 11, 12, and 13, by the rotation of the air exhaust fans 15 and 16 (see FIG. 3). The cooling air led into the light source lamp unit 8 (see FIG. 3) cools the light source device 183 (see FIG. 7) included therein, together with fresh cooling air introduced through an inlet 4A (see FIG. 2) disposed at the bottom of the lower case 4. A part of the cooling air flows to the side of the second power supply block 9B, (see FIG. 7) and the other part of the cooling air flows to the side of the third power supply block 9C, thereby cooling the second and third power supply blocks 9B and 9C. Thereafter, the cooling air is discharged to the front side of the projector 1 by the air-exhaust fans 15 and 16 (see FIG. 3) through the air-outlet 160 (see FIG. 3).

(4) Configuration of the Optical System

The optical unit 10 of the optical system is described in detail as follows with reference to FIGS. 5 and 9.

The optical unit 10 includes the illumination optical system 923, the colored-light-beam separating optical system 924, and a relay optical system 927 received in the upper light guide 901. The optical unit 10 also includes the electro-optical device 925 and the crossed dichroic prism 910 fixed to the lower light guide 902, (see FIG. 6) and the projection lens 6 fixed to the head plate 903 (see FIG. 6) of the lower light guide 902 (see FIG. 6).

The illumination optical system 923 is an integrator illumination optical system for evenly illuminating image forming regions of the three liquid crystal panels 925R, 925G, and 925B which form the electro-optical device 925. The illumination optical system 923 includes the light source device 183, a first lens array 921, a second lens array 922, a reflecting mirror 931, and an integrating lens 932. The lens arrays 921 and 922, the integrating lens 932, and the reflecting mirror 931 are disposed to be supported by vertical portions of the upper light guide 901, and are affixed by clips 7 which are members for preventing these components from falling out when the upper guide 901 is turned over in the state shown in FIG. 3.

The light source device 183 forming the illumination optical system 923 includes the light source lamp 181 which emits, as a radial beam emitter, radial light beams, and the concave mirror 182 which converts the radial light beams from the light source lamp 181 into substantially parallel luminous fluxes and emits the same. Generally, a halogen lamp, a metal halide lamp, or a high pressure mercury-vapor lamp is used as the light source lamp 181. A parabolic mirror or an ellipsoidal mirror is preferably used as the concave mirror 182.

The first lens array 921 includes small lenses 9211, having a substantially rectangular outline, aligned in a matrix having M rows and N columns. The small lenses 9211 split the parallel luminous flux incident from the light source into a plurality (M×N) of split luminous fluxes, and applies the split luminous fluxes in the vicinity of the second lens array 922 to form an image. Each small lens 9211 has an outline of a shape substantially the same as the shape of the image-forming region of each of the liquid crystal panels 925R, 925G, and 925B. For example, when the image-forming region of the liquid crystal panel has an aspect ratio (the ratio of the width to the height) of 4:3, the aspect ratio of each small lens is set to 4:3.

The second lens array 922 includes small lenses 9221 aligned in a matrix having M rows and N columns so as to be associated with the small lenses 9211 of the first lens array 921. The second lens array 922 arranges the center axes of the split luminous fluxes (principal rays) emitted by the first lens array 921 so that the principal rays are applied perpendicularly to the incidence plane of the integrating lens 932. The integrating lens 932 integrates the plurality of split luminous fluxes on the three liquid crystal panels 925R, 925G, and 925B. The second lens array 922 is disposed to be inclined by 90 degrees with respect to the first lens array 921 with the reflecting mirror 931 therebetween.

The reflecting mirror 931 guides the luminous fluxes emitted by the first lens array 921 to the second lens array 922. The reflecting mirror 931 is not always required, depending on the configuration of an illumination optical system. For example, it is not necessary when the first lens array 921 and the light source are disposed parallel to the second lens array 922.

The colored-light-beam separating system 924 according to the present invention includes two dichroic mirrors 941 and 942 and a reflecting mirror 943, and splits the light beams from the integrating lens 932 into the three colored light beams red, green, and blue. Each of the mirrors 941, 942, and 943 is supported by vertical portions of the upper light guide 901 and are fixed to the upper light guide 901 by the clips 7 in the same manner described above.

The relay optical system 927 includes an incident-side lens 954, a relay lens 973, and reflecting mirrors 971 and 972. The reflecting mirrors 971 and 972 are also fixed to the upper light guide 901 by the clips 7.

In the liquid crystal panels 925R, 925G, and 925B included in the electro-optical device 925, for example, polysilicon TFTs are used as switching elements. The liquid crystal panels 925R, 925G, and 925B are disposed in a concave part 904 (see FIG. 5) outside the upper light guide 901 and at the periphery thereof, and are fixed to the corresponding three faces of the crossed dichroic prism 910 by a fixing material in an opposed state. At the incident and emission sides of the liquid crystal panels 925R, 925G, and 925B, incident-side polarizing plates 960R, 960G, and 960B are disposed at the incident side, respectively, and emission-side polarizing plates 961R, 961G, and 961B are disposed at the emission side, respectively.

The crossed dichroic prism 910 forms a colored image by combining three colored light beams. The crossed dichroic prism 910 is fixed to the upper face of the lower light guide 902 (see FIG. 6) by fixing screws. The crossed dichroic prism 910 includes a multilayer dielectric film which reflects red light beams and a multilayer dielectric film which reflects blue light beams disposed substantially in an X-shape along the interfaces between four right-angle prisms. The three colored light beams are synthesized by these multilayer dielectric films.

The projection lens 6 is the heaviest component among the optical components in the projector 1. The projection lens 6 is fixed to the head plate 903 (see FIG. 6) of the lower light guide 902 (see FIG. 6) by screws or the like through a flange 62 (see FIG. 6) disposed at a base end of the projection lens 6.

The optical unit 10 configured as described above is assembled as described below.

The box-shaped upper light guide 901 is placed so that the open side thereof is disposed upward. Optical components (reflecting mirrors, lenses, and the like) such as the illumination optical system 923, the colored-light-beam separating optical system 924, and the relay optical system 927 are placed in the upper light guide 901 and are fixed thereto by the clips 7.

The lid-shaped lower light guide 902 (see FIG. 6) is provided thereon with the crossed dichroic prism 910 having the liquid crystal panels 925R, 925G, and 925B fixed thereto, the crossed dichroic prism 910 being fixed to the lid-shaped lower light guide 902. The projection lens 6 is fixed to the head plate 903 (see FIG. 6). Then, the upper light guide 901 with the optical components fixed thereto is turned over, mounted so as to cover the lower light guide 902, and fixed thereto.

The light guide 900 thus configured is fixed to the lower case 4 by fixing members such as screws.

The lower light guide 902 (see FIG. 6) provided with the liquid crystal panels 925R, 925G, and 925B, the crossed dichroic prism 910, and the projection lens 6 mounted thereon may be fixed to the lower case 4 (see FIG. 3) in advance, then, the upper light guide 901 provided with the optical components may be turned over, mounted so as to cover the lower light guide 902, (see FIG. 6) and fixed to the lower case 4 (see FIG. 3) by fixing members such as screws.

Only the lower light guide 902 (see FIG. 6) may be fixed to the lower case 4 (see FIG. 3) in advance by screws, then, the liquid crystal panels 925R, 925G, and 925B and the crossed dichroic prism 910 are mounted and the projection lens 6 is fixed to the lower light guide 902, (see FIG. 6) and the upper light guide 901 provided with the optical components may be turned over, mounted so as to cover the lower light guide 902, (see FIG. 6) and fixed to the lower case 4 (see FIG. 3) by fixing members such as screws.

Although the crossed dichroic prism 910 and the projection lens 6 are fixed to the lower light guide 902 (see FIG. 6) by screws, and the upper and lower light guides 901 and 902 (see FIG. 6) are fixed to the lower case 4 (see FIG. 3) by screws, other appropriate fixing methods such as bonding and engaging may be used.

(5) Functions of the Optical System

In the optical unit 10 shown in FIG. 9, substantially parallel luminous fluxes emitted by the light source device 183 are split into a plurality of split luminous fluxes by the first and second lens arrays 921 and 922 which form an integrator optical system, the illumination optical system 923. The split luminous fluxes from the small lenses 9211 of the first lens array 921 are applied, by the integrating lens 932 substantially in an integrated fashion, to the image-forming regions of the liquid crystal panels 925R, 925G, and 925B. The liquid crystal panels 925R, 925G, and 925B are illuminated by luminous light substantially evenly distributed in a plane.

In this case, the first dichroic mirror 941 reflects a red beam component and transmits green and blue beam components of the luminous flux from the illumination optical system 923. The red light beam reflected by the first dichroic mirror 941 is reflected by the reflecting mirror 943, is transmitted through a field lens 951, and is applied to the red liquid crystal panel 925R. The field lens 951 converts each split luminous flux from the second lens array 922 into a luminous flux parallel to the central axis (principal ray) of the split luminous flux. The field lenses 952 and 953 provided in front of the liquid crystal panels 925G and 925B have the same function.

The green light beam separated from the green and blue light beams transmitted through the first dichroic mirror 941 is reflected by the second dichroic mirror 942, is transmitted through a field lens 952, and is applied to the green liquid crystal panel 925G. The blue light beam is transmitted through the second dichroic mirror 942, through the relay optical system 927 and a field lens 953, and is applied to the blue crystal panel 925B. The relay optical system 927 for the blue light beam is provided to prevent a reduction in light efficiency usage due to light spreading, which is likely to occur because the optical path of the blue light beam is longer than that of the other color light beams. That is, the relay optical system 927 is provided in order to transmit, as it is, the split luminous flux incident on the incident-side lens 954 to the field lens 953.

When the red, green, and blue light beams are applied to the liquid crystal panels 925R, 925G, and 925B, respectively, the incident-side polarizing plates 960R, 960G, and 960B transmit particular polarized-beams of the incident light beams. The polarized beams are modulated by the liquid crystal panels 925R, 925G, and 925B in accordance with given image data, and are applied to the emission-side polarizing plates 961R, 961G, and 961B, respectively, as modulated beams. The emission-side polarizing plates 961R, 961G, and 961B transmit particular polarized-beams of the modulated beams, and the polarized beams are applied to the crossed dichroic prism 910. The polarized light beams of the colored light beams are converted to combined light beams by being combined by the crossed dichroic prism 910, and are emitted toward the projection lens 6. The combined light beams are projected by the projection lens 6 as colored images on a projection area such as a projection screen.

(6) Light Shielding Structure for Shielding Leakage Light

The liquid crystal panels 925R, 925G, and 925B are mounted on the crossed dichroic prism 910 by using the POP structure, as shown in FIG. 10, in which the liquid crystal panels 925R, 925G, and 925B are disposed opposing three corresponding side faces, as light-incident surfaces of the crossed dichroic prism 910, and are fixed by an adhesive to the three opposing side faces (light-incident surfaces) of the crossed dichroic prism 910, each via a fixing member configured with the pins 80 and the supporting frame 80D. The crossed dichroic prism 910 is mounted on and fixed to a supporting member 81 for supporting the crossed dichroic prism (hereinafter referred to as supporting member), the supporting member 81 being fixed to the lower light guide 902 (see FIG. 6). As shown in FIG. 11, each pin 80 has a cylindrical insertion part 80B and a rectangular exposed part 80C to be exposed when the pin 80 is inserted.

The process of mounting the liquid crystal panels 925R, 925G, and 925B on the crossed dichroic prism 910 is described briefly as follows with respect to FIGS. 10 and 11. The pin 80 coated with an adhesive, which is to be cured by ultraviolet light, at an end and at the insertion part 80B thereof is inserted in each hole 80A formed at four corners of the supporting frame 80D for supporting each of the liquid crystal panels 925R, 925G, and 925B. The end of each pin 80 is brought into contact with a side face of the crossed dichroic prism 910, and each of the liquid crystal panels 925R, 925G, and 925B is temporarily fixed to the crossed dichroic prism 910 by applying weak ultraviolet light. Next, each liquid crystal panel 925R, 925G, or 925B is set in the correct position by adjusting the focus and correcting for aberrations in picture elements while looking at the projected images enlarged and projected by the projection lens 6 (see FIG. 9). Then, strong ultraviolet light is applied so as to finally fix the liquid crystal panels 925R, 925G, and 925B to the side faces of the crossed dichroic prism 910. The POP structure is thus formed.

In the POP structure, shown in FIG. 13, gaps 82 are provided between each of the liquid crystal panels 925R, 925G, and 925B and the side face of the crossed dichroic prism 910 associated therewith, the gaps 82 being provided as a margin in which the distance between each liquid crystal panel 925R, 925G, or 925B and the side face of the crossed dichroic prism 910 is controlled, thereby adjusting the focus and the like.

The projector according to the present invention shown in FIG. 6 is provided with a light shielding member 83 disposed between the head plate 903 and the crossed dichroic prism 910, thereby preventing (shielding) leakage light from the gaps 82 (see FIG. 13) between the liquid crystal panels 925R and 925B and the side faces of the crossed dichroic prism 910 from being applied to the projection lens 6 (see FIG. 9).

As shown in FIGS. 12 and 13, the light shielding member 83 is formed by bending a thin metallic plate, and is coated overall with an antireflection film for avoiding reflection of light. The light shielding member 83 includes a shielding part 84, a positioning part 85, and a flow-regulating part 86.

The shielding part 84 as shown in FIG. 14 is formed so as to cover the periphery of the emission face of the crossed dichroic prism 910 (see FIG. 12) and the gaps, when viewed from the side of the projection lens 6, (see FIG. 9) between the liquid crystal panels 925B and 925R (see FIG. 9) and the associated side faces of the crossed dichroic prism 910 (see FIG. 12). The shielding part 84 is provided with a rectangular opening 84A (see FIG. 15) through which the light beams emitted by the crossed dichroic prism 910 are led toward the projection lens 6, (see FIG. 6) the opening 84A being disposed at the center of the shielding part 84 in front view. The shielding part 84 includes an adhering part 84B (see FIG. 13) disposed below the opening 84A, (see FIG. 13) which adheres to the light emission surface of the crossed dichroic prism 910 (see FIG. 12). The adhering part 84B (see FIG. 13) adheres to the crossed dichroic prism 910 (see FIG. 12) via a double-sided tape 92, whereby the shielding part 84 is connected and fixed to the light emission surface of the crossed dichroic prism 910.

The positioning part 85 is formed from an upper portion of the shielding part 84 bent at a right angle. The positioning part 85 includes a cover part 85A and bent parts 85B for determining the relative position between the light shielding member 83 and the crossed dichroic prism 910.

The cover part 85A comes into contact with the crossed dichroic prism 910 at the upper face thereof so as to cover substantially the whole of the upper face of the crossed dichroic prism 910 (see FIG. 13). The cover part 85A can determine the vertical position of the light shielding member 83 with respect to the crossed dichroic prism 910.

The bent parts 85B are formed by bending protrusions extending from two edges opposite to each other of the cover part 85A. The bent parts 85B come into contact with the side faces of the crossed dichroic prism 910 (see FIG. 13) at the inner surfaces of the bent parts 85B when the cover part 85A is brought into contact with the upper face of the crossed dichroic prism 910 (see FIG. 13). The horizontal position of the light shielding member 83 with respect to the crossed dichroic prism 910 (see FIG. 13) can be determined by the bent parts 85B.

The cover part 85A is provided with an adhering part 85C in the same fashion as is the shielding part 84. The adhering part 85C adheres to the crossed dichroic prism 910 (see FIG. 13) via the double-sided tape 92, thereby fixing the positioning part 85 to the crossed dichroic prism 910 at the upper face thereof. The cover part 85A is provided with a cut-and-raised tab 87 formed by cutting and raising a part of the cover part 85A.

In FIG. 15, the cover part 85A is shown provided with a thermal sensor 88, which is mounted thereon via a fixing terminal 89, and which is a temperature-determining unit which determines the temperature of the liquid crystal panels 925R and 925B (see FIG. 13). The fixing terminal 89 engages with a protrusion 90 which is formed on the cover part 85A by a burring method. By mounting the thermal sensor 88 on the cover part 85A, the temperature at an edge of the cover part 85A, that is, a temperature close to that of the liquid crystal panels 925R and 925B (see FIG. 13) can be determined. When one of the liquid crystal panels 925R and 925B (see FIG. 13) heats up excessively, the excessively heated state is detected by the thermal sensor 88 through the bent parts 85B and the cover part 85A, whereby one sensor can monitor the temperature of a plurality of the liquid crystal panels 925R and 925B (see FIG. 13).

The thermal sensor 88 supplies detected signals to the main board 12 which controls the air-intake fan 17 (see FIG. 8). The thermal sensor 88 thus arranged can control the air-intake fan 17 (see FIG. 8) in a manner such that when the thermal sensor 88 determines that the temperature of the cover part 85A, that is, the temperature of the liquid crystal panels 925R and 925B (see FIG. 13) is high, the revolution of the air-intake fan 17 (see FIG. 8) is increased so as to rapidly cool the liquid crystal panels 925R, 925G, and 925B, (see FIG. 13) and when the thermal sensor 88 determines that the temperature of the cover part 85A, that is, the temperature of the liquid crystal panels 925R and 925B (see FIG. 13) is low, the revolution of the air-intake fan 17 (see FIG. 8) is decreased so as to gradually cool the liquid crystal panels 925R, 925G, and 925B (see FIG. 13).

The flow-regulating part 86 is formed extending horizontally toward the outside from an edge of the shielding part 84 at the side of the liquid crystal panel 925B (see FIG. 13). The flow-regulating part 86 serves for guiding the cooling air from the air-intake fan 17 (see FIG. 8) toward the liquid crystal panel 925B (see FIG. 13). According to the present embodiment, since the liquid crystal panel 925B (see FIG. 13) in particular, which modulates the blue luminous flux, is likely to heat up excessively, the flow-regulating part 86 is disposed in the vicinity of the liquid crystal panel 925B (see FIG. 13). With this arrangement, the cooling air from the air-intake fan 17 (see FIG. 8) can be applied in large volume to the liquid crystal panel 925B (see FIG. 13).

The light shielding member 83 thus arranged is mounted on the crossed dichroic prism 910 in processes described below. As shown in FIG. 14(A), the double-sided tapes 92 are adhered to predetermined positions on the upper face and the light emission surface of the crossed dichroic prism 910. The light shielding member 83 is moved downward in a slanting direction from above the light emission surface of the crossed dichroic prism 910 until an end of the positioning part 85 comes into contact with the upper face of the crossed dichroic prism 910; this operation is performed by holding the cut-and-raised tab 87. Then, as shown in FIG. 14(B), the end of the positioning part 85 is moved slidingly along the upper face of the crossed dichroic prism 910, the shielding part 84 is moved downward, and the adhering parts 84B and 85C (see FIG. 15) are adhered to the double-sided tapes 92, whereby the light shielding member 83 is mounted on the crossed dichroic prism 910.

In FIG. 6, the crossed dichroic prism 910 is provided with a light shielding frame 91 so as to cover the lower part of the light-incident surfaces of the crossed dichroic prism 910. The light shielding frame 91 shields leakage light from the lower part of the crossed dichroic prism 910. The light shielding frame 91 and a wall 91A (see FIG. 5) opposing the upper light guide 901 (see FIG. 5) constitute a light shielding wall for shielding light so that the light emitted from the inside of the light guide 900 (see FIG. 4) toward the prism 910 is not applied to a region other than the display regions of the liquid crystal panels 925R, 925G, and 925B.

The present embodiment offers the following advantages.

Due to the light shielding member 83, leakage light from the gaps 82 (see FIG. 13) between the liquid crystal panels 925R and 925B and the crossed dichroic prism 910 toward the projection lens 6 can be shielded, whereby only the luminous flux emitted by the crossed dichroic prism 910 can be applied to the projection lens 6. With this arrangement, when reducing the device in size, the quality of projected images is not deteriorated.

Due to the flow-regulating part 86 provided in the light shielding member 83, the cooling air from the air-intake fan 17 (see FIG. 8) can be applied in large volume to the liquid crystal panels 925R, 925G, and 925B and the polarizing plates 960R, 960G, 960B, 961R, 961G, and 961B (see FIG. 9) which are not heat resistant, thereby effectively cooling the liquid crystal panels 925R, 925G, and 925B.

As shown in FIG. 10, the light shielding member 83 is provided with the positioning part 85 including the cover part 85A and the bent parts 85B, thereby horizontally and vertically determining the position of the opening 84A of the light shielding member 83. With this arrangement, the horizontal and vertical position of the opening 84A of the light shielding member 83 can be determined easily, thereby facilitating the mounting operation of the light shielding member 83.

The light shielding member 83 is formed by bending a thin metallic plate so as to improve thermal conduction, and the cover part 85A is provided with the thermal sensor 88, thereby determining the temperature close to the actual temperature of the liquid crystal panels 925R, 925G, and 925B. With this arrangement, a temperature rise in the liquid crystal panels 925R, 925G, and 925B can be suppressed easily and positively.

The cover part 85A is provided with the cut-and-raised tab 87, whereby the light shielding member 83 can be easily mounted on and removed from the crossed dichroic prism 910 by moving the light shielding member 83 by holding the cut-and-raised tab 87, thereby facilitating the operation of mounting the crossed dichroic prism 910 on the head plate 903 (see FIG. 6).

The shielding part 84 and the positioning part 85 are adhered and fixed to the crossed dichroic prism 910 via double-sided tapes, whereby the bonding operation and the like are made simple, thereby further simplifying the operation of mounting the light shielding member 83 on the crossed dichroic prism 910.

The light shielding member 83 is coated with an antireflection film, whereby reflection of light at the light shielding member 83 can be suppressed, thereby avoiding effects on images and improving the quality of projected images.

The flow-regulating part 86 is formed disposed in the vicinity of the liquid crystal panel 925B, and cooling air from the air-intake fan 17 (see FIG. 8) is guided by the flow-regulating part 86, whereby the cooling air is applied in large volume to the liquid crystal panel 925B, thereby suppressing a rapid temperature rise in the liquid crystal panel 925B. With this arrangement, the efficiency of cooling the liquid crystal panels 925R, 925G, and 925B can be further improved.

As shown in FIG. 6 the light shielding frame 91 is provided along the light-incident surfaces of the crossed dichroic prism 910, for shielding the lower part of the crossed dichroic prism 910, whereby leakage light from the lower part of the crossed dichroic prism 910 can be shielded, and only the luminous flux emitted by the crossed dichroic prism 910 can be applied to the projection lens 6. With this arrangement, when reducing the device in size, the quality of projected images is not deteriorated.

The present invention is not limited to the embodiment described above. The present invention includes other arrangements and the like which can achieve the object of the present invention, and includes modifications described below.

For example, although the light shielding frame 91 is independently formed so as to cover the crossed dichroic prism 910, according to the embodiment described above, the light shielding frame 91 can be formed integrally with the upper light guide 901 (see FIG. 5) or with the lower light guide 902, or it can be omitted unless light leaks from the lower part of the prism.

According to the above-described embodiment, although the flow-regulating part 86 is formed disposed in the vicinity of the liquid crystal panel 925B, it may be formed disposed, for example, in the vicinity of the liquid crystal panel 925R or the liquid crystal panel 925G. However, the flow-regulating part 86 is preferably disposed in the vicinity of the liquid crystal panel 925B, for suppressing a temperature rise therein, which is particularly likely to heat up excessively.

Although the light shielding member 83 is coated with an antireflection film in the above-described embodiment, a light shielding member may be made of a material which does not reflect light or a material having a rough surface which reduces reflection, thereby eliminating the coating. It is not necessary to coat the entire surface of the light shielding member with the antireflection film. The antireflection film may be disposed at at least one position from which reflected light beam is to be applied to the projection lens 6.

As shown in FIG. 12, although the shielding part 84 is adhered to the crossed dichroic prism 910 via the adhering part 84B in the above-described embodiment, the shielding part 84 may be fixed to the crossed dichroic prism 910 at the light emission surface thereof by any method other than the adhering part 84B.

According to the embodiment described above, the light shielding member 83 is adhered to the crossed dichroic prism 910 by double-sided tapes. The adhesive material may be a liquid adhesive or others which can fix the light shielding member 83 to the crossed dichroic prism 910 so as not to be removed.

According to the above-described embodiment, although the cover part 85A is provided with the cut-and-raised tab 87, it is not necessary to be cut and raised. A tab may be made individually of a plate-like material and be bonded and fixed to the upper face of a cover part by an adhesive or the like. It can be omitted when the light shielding member 83 can be easily mounted and removed without the tab.

Although the thermal sensor is disposed at the light shielding member side, according to the above-described embodiment, the thermal sensor may be disposed in the vicinity of an electro-optical device. The thermal sensor may be omitted when the temperature rise according to the period of use of the electro-optical device is known.

According to the above-described embodiment, although the light shielding member is made of metal, it may be made of plastic. The material for the light shielding member is preferably thermally conductive when the light shielding member is provided with a thermal sensor.

Although the positioning part includes the cover part and the bent parts, it may include only one of the cover part and the bent parts, or both of them may be omitted. The position at which the positioning part is disposed is not limited to that which is described in the above-described embodiment. The horizontal and vertical position of the light shielding member can be easily determined when the positioning part includes a first positioning section which comes into contact with an upper part of the lower face of the prism and a second positioning section which comes into contact with the side faces of the prism, which is a structure different from that which is described in the above-described embodiment, thereby facilitating the mounting operation of the light shielding member.

The flow-regulating part may be omitted when an air-intake fan is formed or controlled so as to apply cooling air to the electro-optical device in large volume.

The crossed dichroic prism is not limited to that which is provided with two types of dielectric multilayer films formed substantially in an X-shape along the interfaces between four right-angle prisms. It may be formed in a manner such that, for example, two dichroic mirrors are assembled substantially in an X-shape, and a liquid is provided thereabout. A prism may be formed in which two types of dielectric multilayer films are formed along the interfaces between three prisms having shapes different from each other. The crossed dichroic prism according to the embodiment described above may be replaced by any prism (including mirrors which are arranged so as to have the same function as a prism) which can combine colors and to which an optical modulation device can be fixed at the periphery thereof.

Although the shielding part described in the above embodiment is provided with the adhering part 84B only below the opening 84A, adhering parts may be provided, for example, as shown in FIG. 15, along the edges of the opening 84A.

The shape of the light shielding member is not limited to that which is described in the above embodiment. For example, a light shielding member 93 shown in FIG. 15 can be used. The shape and the configuration of the light shielding member may be appropriately determined when carrying out the invention so as to satisfy the condition in which leakage light toward the projection lens from the gaps between the optical modulation device and the crossed dichroic prism is shielded.

Although the liquid crystal panels 925R, 925G, and 925B are adhered and fixed to the prism 910 by the supporting frames 80D and pins 80, (see FIG. 11) according to the above-described embodiment, the invention is not limited to this configuration. For example, the supporting frames 80D and the prism 910 may be fixed directly to each other by an adhesive or by soldering at the side faces of the prism 910, instead of using a fixing member such as the pins 80 (see FIG. 11). The optical modulation device, such as liquid crystal panels, may be fixed to the prism in any fashion as long as the optical modulation device is fixed to the prism at a predetermined distance from the side faces of the prism.

Although the electro-optical device 925 is configured with the three liquid crystal panels 925R, 925G, and 925B, according to the above-described embodiment, an optical modulation device configured with two, four, or more liquid crystal panels may be used according to the present invention.

Although the projector uses liquid crystal panels as an optical modulation device, according to the above-described embodiment, the projector according to the present invention may use an optical modulation device including plasma elements or micro-mirrors. The liquid crystal panels according to the above-described embodiment may be replaced by other devices which can form images and modulate light beams.

Although the liquid crystal panels 925R, 925G, and 925B according to the embodiment described above transmit and modulate the luminous fluxes R, G, and B, the projector according to the present invention may be a projector provided with a reflective type optical modulation device which modulates while reflecting and then emits incident light beams.

As described above, the projector according to the present invention is provided with a light shielding member which shields leakage light from gaps between the electro-optical device and the prism toward the projection lens side, the leakage light from the gaps between the electro-optical device and the prism toward the projection lens side can be shielded and only the luminous fluxes emitted by the prism can be applied to the projection lens, whereby the quality of projected images is not deteriorated when the device is reduced in size.

What is claimed is:

1. A projector comprising:
   a plurality of optical modulation devices for modulating a plurality of colored light beams in accordance with image data;
   a prism for combining the light beams modulated by the optical modulation devices, the plurality of optical modulation devices being mounted on the prism at side faces thereof at a predetermined distance from the side faces of the prism;

a projection lens for enlarging and projecting the light beams combined by the prism; and a light shielding member that shields light which leaks from gaps between the optical modulation devices and the side faces of the prism toward the projection lens side, the light shielding member providing an opening that leads therethrough light beams emitted from the prism and a positioning part that determines the relative position between the opening and a light emission surface of the prism, the opening being formed in a shielding part disposed in contact with the light emission surface of the prism, the shielding part is fixed to the light emission surface of the prism, and the positioning part is fixed to a surface of the prism other than the light emission surface thereof.

2. A projector according to claim 1, further comprising:

an outer casing that receives the optical modulation devices, the prism, and the projection lens;

an air inlet formed in the external face of the outer casing, that introduces air therethrough from the outside to the inside of the outer casing as cooling air; and a cooling fan that introduces cooling air through the air inlet and cooling the optical modulation devices, the light shielding member having a flow-regulating part that introduces cooling air from the cooling fan toward the optical modulation devices.

3. A projector according to claim 2, the plurality of optical modulation devices being three optical-modulation devices for modulating red, green, and blue colored luminous fluxes, respectively, and the flow-regulating part is disposed in the vicinity of the optical modulation device for modulating the blue colored luminous flux.

4. A projector according to claim 1, the light shielding member being made of a metal, and a thermal sensor that determines the temperature of the optical modulation devices is mounted on the shielding member.

5. A projector according to claim 1, the light shielding member providing a cut-and-raised tab formed by cutting and raising a part of the light shielding member.

6. A projector according to claim 1, the shielding part being bonded to the light emission surface of the prism along edges of the opening.

7. A projector according to claim 1, an antireflection film that suppresses reflection of light beams being at least one section of the light shielding member.

8. A projector according claim 1, further comprising:

an optical-component casing that receives optical components;

the prism being mounted in the optical-component casing via a prism-supporting member that supports the prism, and the light shielding member is disposed between the prism and the optical-component casing so as to cover the lower part of the side faces of the prism on which the optical modulation device is mounted.

* * * * *